United States Patent
Laubli (10) Patent No.: US 8,763,782 B2
(45) Date of Patent: Jul. 1, 2014

(54) DEVICE AND METHOD FOR PRODUCING TUBES

(75) Inventor: Julius Laubli, Rapperswil (CH)

(73) Assignee: KMK Lizence Ltd., Port Louis (MU)

( * ) Notice: Subject to any disclaimer, the term of this patent is extended or adjusted under 35 U.S.C. 154(b) by 520 days.

(21) Appl. No.: 13/128,433

(22) PCT Filed: Nov. 11, 2009

(86) PCT No.: PCT/EP2009/008037
§ 371 (c)(1),
(2), (4) Date: Jul. 21, 2011

(87) PCT Pub. No.: WO2010/054804
PCT Pub. Date: May 20, 2010

(65) Prior Publication Data
US 2012/0018279 A1    Jan. 26, 2012

(30) Foreign Application Priority Data
Nov. 11, 2008    (DE) .......................... 10 2008 056 797

(51) Int. Cl.
*B23Q 39/04*    (2006.01)
*B29C 44/14*    (2006.01)

(52) U.S. Cl.
USPC .............. 198/346.1; 198/474.1; 156/538; 425/114

(58) Field of Classification Search
USPC .......... 198/343.1, 343.2, 346.1, 346.2, 469.1, 198/474.1; 425/114, 123; 156/538, 567
See application file for complete search history.

(56) References Cited

U.S. PATENT DOCUMENTS

| | | | |
|---|---|---|---|
| 3,990,826 A | | 11/1976 | Marcus |
| 3,994,644 A | * | 11/1976 | Hegler et al. .................. 425/112 |
| 4,351,629 A | * | 9/1982 | Farrell ........................... 425/116 |
| 4,419,064 A | * | 12/1983 | Magerle ........................ 425/256 |
| 4,834,638 A | * | 5/1989 | Miyahara et al. ............. 425/116 |
| 4,915,210 A | * | 4/1990 | Jowitt et al. ................ 198/476.1 |
| 4,931,006 A | | 6/1990 | Schwyn et al. |

(Continued)

FOREIGN PATENT DOCUMENTS

DE    1130155 B    5/1962
DE    4009661 C1    3/1991

(Continued)

OTHER PUBLICATIONS

German Search Report, dated Jun. 2, 2009.

(Continued)

*Primary Examiner* — Douglas Hess
(74) *Attorney, Agent, or Firm* — Bachman & LaPointe, P.C.

(57) ABSTRACT

A device for production of tubes, includes a plurality of mandrel assemblies, each comprising multiple mandrels on which the tubes can be produced in steps at a plurality of work stations, wherein the mandrel assemblies can be transported from work station to work station using transport means. The mandrels of at least one of the mandrel assemblies are distributed into a first and at least a second mandrel group, and in at least one of the work stations the first mandrel group can be moved from a processing position associated with the work station, in which the work station can interact with the first mandrel group to a park position associated with the work station, and the second mandrel group can be moved from a park position associated with the work station to a processing position associated with the work station.

11 Claims, 7 Drawing Sheets

(56) References Cited

U.S. PATENT DOCUMENTS

| | | | | |
|---|---|---|---|---|
| 5,156,711 | A * | 10/1992 | Schwyn | 156/379.7 |
| 5,211,798 | A | 5/1993 | Keller | |
| 5,320,511 | A * | 6/1994 | Woerner | 425/130 |
| 5,468,327 | A * | 11/1995 | Pawlowicz et al. | 156/393 |
| 5,927,474 | A * | 7/1999 | Owen et al. | 198/475.1 |
| 6,334,767 | B2 * | 1/2002 | Kieras et al. | 425/392 |
| 6,494,980 | B1 * | 12/2002 | Rothemeyer et al. | 156/169 |
| 7,261,033 | B2 * | 8/2007 | Dubuit et al. | 101/40.1 |
| 7,311,515 | B2 * | 12/2007 | Netsu | 425/534 |
| 8,202,079 | B2 * | 6/2012 | Litzenberg et al. | 425/534 |
| 2001/0048953 | A1 | 12/2001 | Kieras et al. | |

FOREIGN PATENT DOCUMENTS

| | | |
|---|---|---|
| EP | 0297257 A1 | 1/1989 |
| EP | 0794044 A2 | 9/1997 |
| EP | 1862282 A1 | 12/2007 |
| FR | 2596699 A1 | 10/1987 |
| FR | 2797602 A1 | 2/2001 |

OTHER PUBLICATIONS

International Search Report, Jan. 6, 2010.

* cited by examiner

DEVICE AND METHOD FOR PRODUCING TUBES

BACKGROUND

The invention relates to a device for producing tubes and to a method for producing tubes.

Known devices for producing plastic tubes encompass a plurality of mandrel arrangements, which are fixedly arranged on a rotatable table and each of which comprise a plurality of mandrels, on which the tubes are produced step by step at work stations, which are arranged so as to be distributed across the periphery of the rotatable table. Each work station thereby encompasses a number of tools, which corresponds to the number of the mandrels of a mandrel arrangement, so as to be able to produce the tubes simultaneously at all of the mandrels of a mandrel arrangement. The high costs for equipment are a disadvantage in the case of the known devices.

A mandrel carousel, in the case of which mandrel arrangements are fixedly arranged on an indexing plate and can thus be transported from work station to work station, is known from U.S. Pat. No. 3,990,826 A. It is furthermore known that each mandrel arrangement consists of two identical mandrel groups, which are fixedly arranged on the indexing plate and which are arranged so as to be located diametrically opposite one another with reference to the axis of rotation of the indexing plate and which cannot be adjusted relative to the indexing plate at a work station.

DE 40 09 661 C1 shows a mandrel carousel, in the case of which mandrel arrangements as a whole are relative to the indexing plate, so as to be able to interact with presses, which are arranged on the side of the indexing plate.

SUMMARY OF THE INVENTION

The invention is based on the object of specifying a device for producing tubes, which can be realized in a more cost-efficient manner. The object is further to propose an optimized method for producing tubes, which provides for the use of cost-efficient production devices. Preferably, the output of tubes, which can be produced, is to not be impacted negatively.

With reference to the device, this object is solved by means of the features set forth hereinafter and with reference to the method, this object is solved by means of the features set forth hereinafter. Advantageous developments of the invention are specified in the subclaims. All of the combinations of at least two features, which are disclosed in the description, the claims and/or the figures, fall within the scope of the invention. To avoid repetitions, features, which are disclosed as belonging to the method, are to be considered as having been disclosed as belonging to the device and are to be capable of being claimed. Likewise, features, which are disclosed as belonging to the device, are to be considered as having been disclosed as belonging to the method and are to be capable of being claimed.

The invention uses the knowledge that the time required for at least two operating steps, which are to be carried out at work stations, which are spaced apart from one another, in response to the production of the tubes on the mandrels, varies. For instance, only half of the cycle time is required for operating steps, such as the loading and unloading of the mandrels, for example, than for other process steps, such as for the pressing operation of the tube shoulder, for example. The step of fixing the tube shoulder to the tube pipe body is also the most time-consuming method step in the case of devices, where a pressing operation of tube shoulders with tube pipe bodies does not take place, but where the tube shoulder is injection molded to the pipe body in an injection molding process. In the case of devices known from the state of the art, the other work stations, which operate more quickly, are at a standstill during the at least one longer operating step for a comparatively long period of time. To minimize this downtime of individual work stations and to simultaneously create the possibility for minimizing the number of tools at at least one quickly clocked work station, preferably to at least halve it, the invention proposes to divide the mandrels of at least one mandrel arrangement, preferably the mandrels of all of the mandrel arrangements, into a first and at least a second mandrel group, wherein the mandrel groups of the at least one mandrel arrangement can be adjusted at at least one work station between at least one, preferably only one, processing position and at least one stand-by position. Preferably, this adjusting movement is realized as relative adjusting movement of the mandrel group to transport means, by means of which the mandrel arrangements can be transported from work station to work station. In so doing, it is possible for the first time that at least two mandrel groups of a mandrel arrangement can be processed consecutively, in each case in the processing position at a work station, preferably in the time, which the slowest work station requires for processing the tubes on another mandrel arrangement, preferably for the simultaneous processing of all of the tubes of this mandrel arrangement or in the time, which the most time-intensive operating step takes, respectively. In the event that provision is made for two mandrel groups for each mandrel arrangement, the number of the tools of the work station, which process the two mandrel groups consecutively, can be halved. In the event that provision is made for three mandrel groups, it can be reduced to a third, etc. An embodiment, in the case of which all of the mandrel groups of the at least one mandrel arrangement encompass the same number of mandrels, is particularly preferred. Preferably provision is made for a separate stand-by position for each mandrel group of the at least one mandrel arrangement, wherein an embodiment comprising a number of stand-by positions, which corresponds to the number of the mandrel groups minus one, can also be realized. It is further preferred when provision is made at the corresponding work station for only one common processing position (which is to be controlled consecutively) for all of the mandrel groups of the at least one mandrel arrangement.

As was indicated above, the realization of a relative adjustability of the mandrel groups of at least one mandrel arrangement relative to the trajectory of the mandrel arrangements from work station to work station or to the transport means for the mandrel arrangements, respectively, provides for the reduction of the tools at at least one work station, because all of the mandrel groups cannot be processed simultaneously, but at least two mandrel groups of a mandrel arrangement can be processed consecutively. In a first approach, the output of the device is not influenced negatively in the event that the processing time for a mandrel group corresponds at least approximately to the processing time for the longest processing step, divided by the number of the mandrel groups of the mandrel arrangement.

An embodiment of the device, in the case of which the first and the at least second mandrel group cannot be adjusted consecutively between the processing position and the at least one stand-by position or between the at least one stand-by position and the processing position, respectively, but in the case of which the adjustment of the mandrel groups of the at least one mandrel arrangement takes place simultaneously, preferably in a coupled movement, is particularly preferred.

It is thereby particularly preferred when the first and the second mandrel group can be adjusted by a translatory adjustment of the mandrel arrangement, which encompasses the mandrel groups, between the processing position and the stand-by position. In other words, the entire mandrel arrangement is preferably adjusted and not the mandrel groups of a mandrel arrangement relative to one another. More preferably, the mandrel groups of the mandrel arrangement are embodied as mandrel rows for this purpose, which preferably extend at right angles to the translatory adjusting direction. As will be explained below, a cam disk is used to realize a translatory adjusting movement. In the alternative, the use of, in particular, pneumatic, hydraulic or electric linear adjusting drives is possible, which can be transported from work station to work station, preferably together with the assigned mandrel arrangement. As an alternative to a translatory adjusting movement, the mandrel arrangement can also be adjusted by rotation, so that the mandrel groups of the mandrel arrangement can be adjusted in a rotary movement between the corresponding processing position and the stand-by position relative to the work station, preferably by rotating the entire mandrel arrangement.

In a development of the invention, provision is advantageously made for the mandrel groups to be able to be transported from work station to work station on a circular trajectory (except for the deflection movements of the mandrel groups), relative to which the mandrel groups can be adjusted in the case of at least one work station. In the alternative, an embodiment can also be realized, in the case of which the mandrel groups are transported from work station to work station in a translatory manner at least in sections, wherein the mandrel arrangements are preferably guided in a circular flow in this embodiment as well.

For the realization of a circular trajectory of the mandrel arrangements from work station to work station, it is preferred to arrange the mandrel arrangements on a rotatable table (transport means), relative to which at least the mandrel groups of one mandrel arrangement can be adjusted. In the event that at least one mandrel arrangement, preferably all mandrel arrangements, are not arranged statically on a rotatable table, as is the case in the state of the art, but in the event that they are arranged so as to be capable of being adjusted relative thereto, the table can preferably be driven in a rotatable manner with the help of a servomotor or in the alternative with the help of a step-by-step drive.

It is most preferably when the adjusting movement of the first and of the second mandrel group is realized as a movement, which is guided by a cam disk, wherein the cam disk can preferably be rotated from work station to work station relative to the table or to the trajectory of the mandrel arrangements, respectively. The realization of a cam disk, which preferably encompasses a guide slot, provides for a particularly precise adjustment of the at least two mandrel groups between the processing station assigned thereto and the stand-by position assigned thereto.

It is particularly advantageous when the cam disk is adjusted in a first direction in response to a transport of the mandrel arrangements from work station to work station, preferably in the transport direction of the mandrel arrangements. Preferably, this movement of the cam disk in the first direction is designed such that a relative movement of the cam disk to the mandrel arrangements does not take place hereby. For adjusting the first and the at least second mandrel group relative to the trajectory thereof from work station to work station, it is further preferred when the cam disk is driven in a second direction, which is opposite to the first direction, in particular the transport direction. Preferably, the adjusting movement of the cam disk in this second direction takes place in response to work equipment, which is at a standstill, preferably when the table is at a standstill, namely when the mandrel arrangements are not transported from work station to work station. In other words, the cam disk can preferably be moved in the manner of a ratchet, alternately in a first and a second direction, which is opposite to the first direction, preferably such that a relative movement is not realized between the cam disk and the mandrel arrangements in response to the adjusting movement in the first direction, but only in response to the adjusting movement in the second direction, so as to adjust the mandrel groups only when the table is at a standstill, preferably in a translatory manner, between the corresponding processing position and the corresponding stand-by position.

In a development of the invention, provision is advantageously made for the stand-by position of the first and/or of the second mandrel group at one of the work stations to correspond to the processing position of another work station, preferably of the work station, which is adjacent in the direction of movement, so as to ensure that each tube blank can maintain a sufficient rest period prior to the next processing step.

An embodiment, in the case of which one of the work stations, relative to which the mandrel arrangements can be adjusted by means of the transport means, is an unloading station, is most preferred. In the alternative, it is not an unloading station, but a reloading station for reloading the unfinished tubes to further mandrels, which can be adjusted between further work stations by means of a transport device, which is arranged adjacent to the transport means. Preferably, the transport means as well as the transport device thereby encompass a rotatable table in each case. Most preferably, the still unfinished tubes are transported to at least one cover assembly station by means of the transport device, where a cover is assembled on an external thread in the area of a tube outlet, preferably by means of twisting the cover.

The invention also leads to a method for producing tubes, in particular plastic tubes and/or of at least one film comprising at least one plastic layer, preferably by using a device, which is embodied according to the concept of the invention. It is the core of the method that not only the mandrel arrangements are transported from work station to work station, but that the opportunity is given, at least in the case of one mandrel arrangement, preferably in the case of all of the mandrel arrangements, for mandrel groups of the at least one mandrel arrangement in the case of at least one work station to be capable of being adjusted between a processing station, in which one mandrel group can interact with the work station, and a stand-by position. In other words, the opportunity of a relative movement of mandrel groups of at least one of the mandrel arrangements relative to the actual trajectory of the mandrel arrangement from work station to work station is created, so that not all of the mandrels of the at least one mandrel arrangement or the blanks, which are fed towards it, respectively, must be processed simultaneously by the work station in the case of at least one work station, but that the mandrel groups of the mandrel arraignment can be processed consecutively by the work station.

In view of advantageous developments of the method, reference is made to the above disclosure of preferred embodiments of the device. Features disclosed with reference to this are to also be considered as having been disclosed as belonging to the method and are to be capable of being claimed.

BRIEF DESCRIPTION OF THE DRAWINGS

Further advantages, features and details of the invention result from the subsequent description of preferred exemplary embodiments as well as by means of the drawings.

The same elements and elements having the same function are identified with the same reference numerals in the figures.

DETAILED DESCRIPTION OF THE PREFERRED EMBODIMENT(S)

Figure 1:
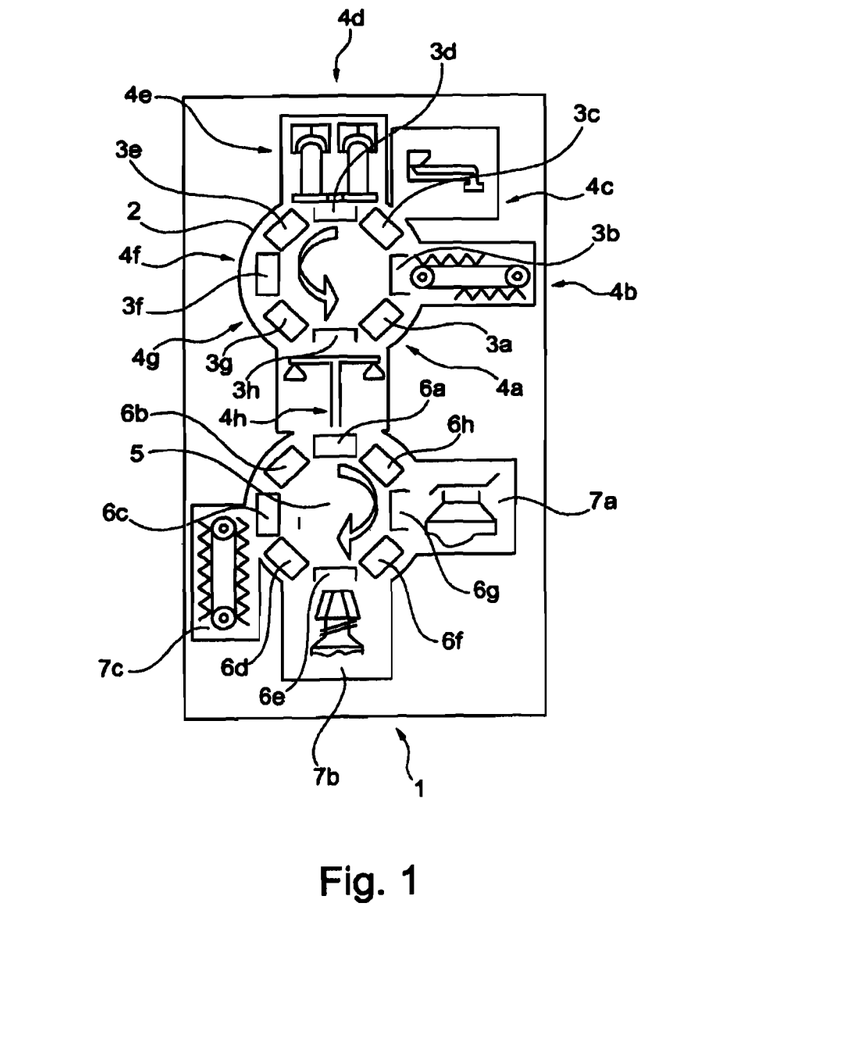
FIG. 1 shows a schematic illustration of a device for producing tubes.
Figure 2A:
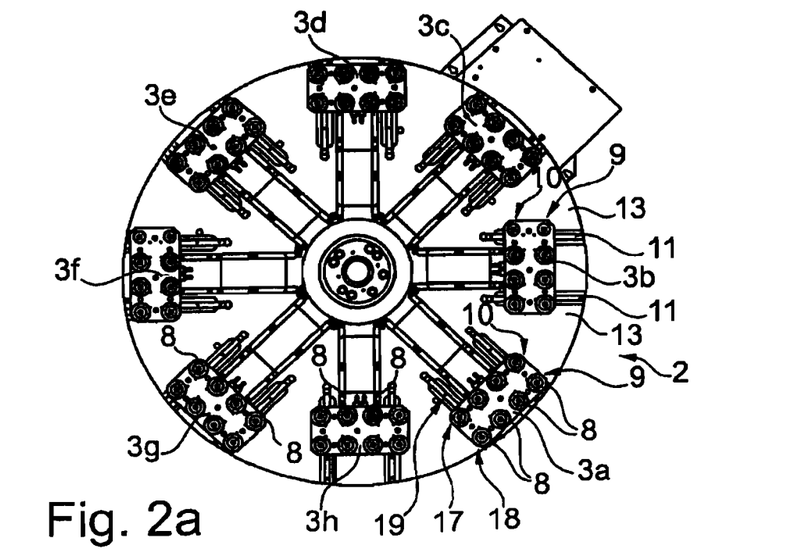
FIGS. 2a to 2d show different views of transport means and mandrel arrangements of a device for producing tubes.
Figure 2B:
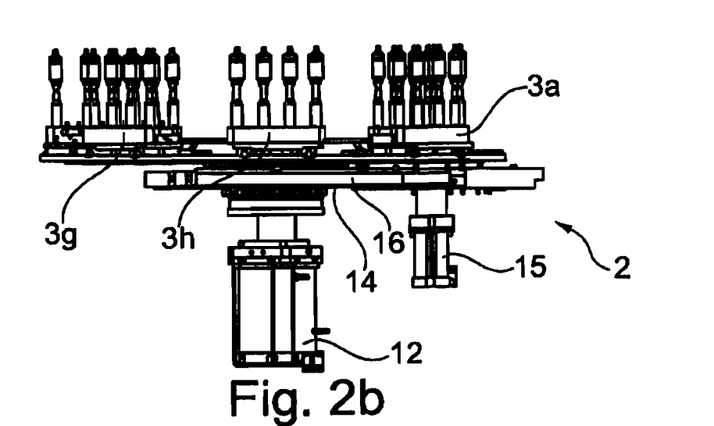
Figure 2C:
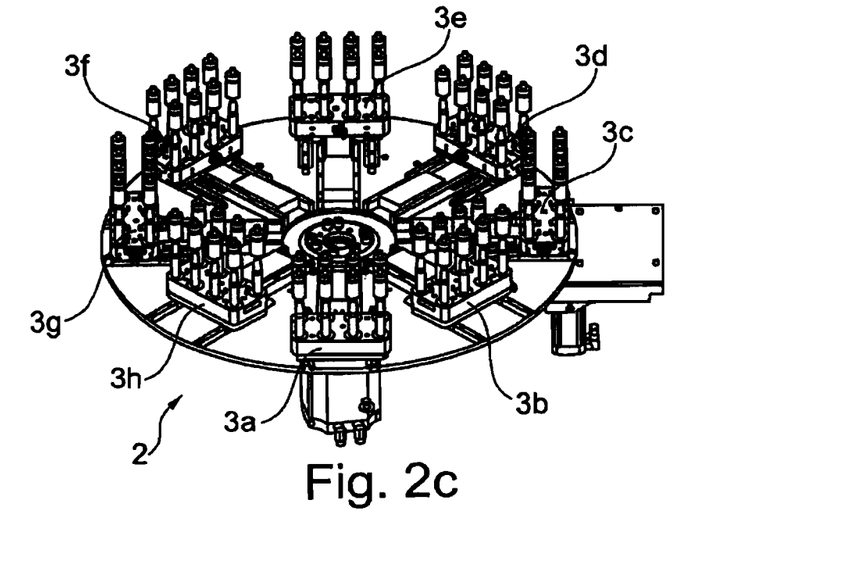
Figure 2D:
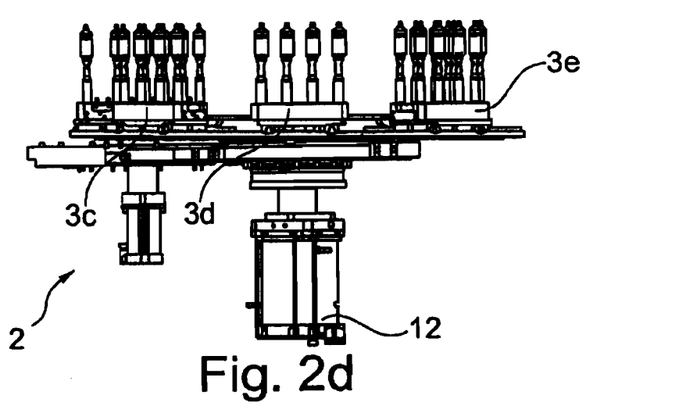

A device 1 for carrying out a method for producing tubes of plastic is shown in FIG. 1 in sections in a highly diagrammed view. The device 1 comprises rotatable transport means 2 for transporting mandrel arrangements 3a-3h from work station 4a-4h to work station 4a-4h. A total of eight work stations 4a-4h are arranged around the transport means 2. The work station, which is identified with reference numeral 4a, is an optional work station, which can be embodied for equipping the mandrel arrangements 3a-3h with a shoulder protection and/or with insert parts, for example, if required. The work station 4b is a loading station, by means of which mandrel groups of the mandrel arrangements 3a-3h, which will be explained below, can be equipped consecutively with tube pipe bodies. The work station identified with reference numeral 4c is a combined extrusion/equipping station, in which the mandrels of the mandrel arrangements 3a-3h are equipped with extruded plastic rings. The work station identified with reference numeral 4d, which is adjacent in peripheral direction, is a compression station, in the case of which tube shoulders comprising integrally molded outlets are formed from the previously equipped plastic rings and are simultaneously integrally molded to the tube pipe bodies. The three adjacent work stations 4e, 4f and 4g are cooling stations, in the case of which the shoulders comprising the outlets, which are integrally molded thereon, are cooled with the help of fans and/or an internal mandrel cooling. The seventh work station, which is identified with reference numeral 4h, is a reloading station, by means of which unfinished tubes are removed from the transport means 2 or from the mandrel arrangements 3a-3h of the transport means 2, respectively, and are reloaded onto a transport device 5 or mandrel packets 6a-6g, respectively. The mandrel packets 6 are adjusted between further work stations 7a-7c with the help of the transport device 5, wherein the work station identified with reference numeral 7a is an optional sealing station, the work station identified with reference numeral 7b is a cap or cover assembly station, respectively, and the work station identified with reference numeral 7c is an unloading station. As can be seen from FIG. 1, the number of the mandrel arrangements 3a-3h corresponds to the number of the mandrel packets 6. The number of the non-illustrated mandrels of the mandrel arrangements 3a-3h also corresponds to the number of the mandrels of the mandrel packets 6. As results further from FIG. 1, the transport means 2 rotate in a direction, which is opposite to the direction of rotation of the transport device 5, here counter-clockwise.

It shall be noted at this point already, which will be specified in more detail at a later point, that mandrel groups, which are not shown at the work stations 4a, 4b, 4c and 4h, of the corresponding mandrel arrangement, which is located at the respective work station, interact with the work station 4a, 4b, 4c, 4h consecutively, that is, they are processed by it consecutively, whereas a simultaneous processing of all of the mandrels, that is, of the tube blanks of the corresponding mandrel arrangements located on the mandrels, takes place at the other work stations 4d, 4e, 4f and 4g.

FIGS. 2a to 2d show in different views, in partially perspective views, the design of the transport means 2 as well as of the mandrel arrangements 3a-3h. As results from FIGS. 2a to 2d, each mandrel arrangement 3a-3h encompasses two groups of mandrels 8, namely a first mandrel group 9 and a second mandrel group 10, which is arranged so as to be stationary relative thereto. Both mandrel groups 9, 10 encompass the same number of mandrels 8, here four mandrels 8. The mandrels 8 of the two mandrel groups 9, 10 are in each case arranged as mandrel row, wherein the mandrel rows extend tangentially to the direction of movement of the mandrel arrangements 3a-3h from work station 4a-4h to work station 4a-4h.

Each mandrel arrangement 3a-3h in turn is arranged on guide rails 11, on which the mandrel arrangements 3a-3h can be adjusted relative to the circular trajectory, on which the mandrel arrangements 3a-3h can be adjusted from work station to work station. In response to this translatory adjusting movement along the guide rails 11, the corresponding mandrel arrangements 3a-3h are adjusted relative to the transport means 2, more accurately relative to a table 13, which can be rotatably driven by means of a servomotor 12. To realize this relative adjusting movement, provision is made for a cam disk 14, which will be explained in detail below, which can be driven via a belt 16 with the help of an auxiliary motor 15, which is embodied as a servomotor 12.

By adjusting specific mandrel arrangements 3a-3h relative to the circular trajectory, the mandrel groups 9, 10 of each correspondingly adjustable mandrel arrangement 3a-3h can be adjusted between a processing position, in which the work station can interact with the corresponding mandrel group 9, 10, and a stand-by position in each case, in which the work station cannot interact with the corresponding mandrel group. This shall be explained in an exemplary manner with the help of the mandrel arrangement according to FIG. 2a, which is identified with reference numeral 3a. In the case of this mandrel arrangement 3a, the second mandrel group 10, that is, the radially inner row of mandrels 8, is in a processing position 17, in which the work station, which is not drawn in, can interact with the second mandrel group 10. The first mandrel group 9 is located in a first stand-by position 18, in which the non-illustrated work station cannot interact with the mandrels 8 of the first mandrel group 9. After the processing of the second mandrel group 10, the mandrel arrangement 3 is adjusted radially inward in a translatory manner relative to the transport means 2 such that the first mandrel group 9 reaches the processing position 17, in which the non-illustrated work station can interact with the first mandrel group 9. The second mandrel group 10, which was previously stationed in the (common) processing position 17, is then in a radially inward, second stand-by position 19, in which the work station cannot interact with the second mandrel group 10. In other words, a common processing position 17 and their own stand-by position 18, 19 are in each case assigned to the two mandrel groups 9, 10 of a mandrel arrangement 3a-3h.

The mandrel arrangements 3a-3h can be extended arbitrarily by further mandrel groups, which are preferably embodied as rows, wherein provision must be made for a corresponding number of stand-by positions. The shown subdivision of the mandrel arrangements 3a-3h into two respective mandrel groups 9, 10 makes it possible that provision should be made in the case of certain work stations for only a number of tools, which corresponds to the number of the mandrels 8 of the first or of the second mandrel group 9, 10.

The shown subdivision of the mandrel arrangements 3a-3h into two mandrel groups 9, 10 each makes it possible that provision must be made in the case of certain work stations for only a number of tools, which corresponds to the number of the mandrels 8 of the first or of the second mandrel group 9, 10. Provision must be made for a number of tools, which corresponds to the number of the mandrels 8 of the corresponding mandrel arrangement only at the work stations, at which a simultaneous processing of all of the mandrels of the respective mandrel arrangement 3a-3h located there must take place.

As will be explained below, not all of the mandrel arrangements 3a-3h are adjusted in a translatory manner on the guide rails 11 at each work station relative to the trajectory. The adjusting movement is only realized at the work stations 4a, 4b, 4c and 4h, which are explained in FIG. 1, at which the mandrel groups 9, 10 of the corresponding mandrel arrangement 3a-3h are processed consecutively.

The guided relative adjusting movement of the mandrel groups relative to the trajectory or between a processing position and two stand-by positions will be explained below by means of FIGS. 3a to 3f.

Figure 3A:
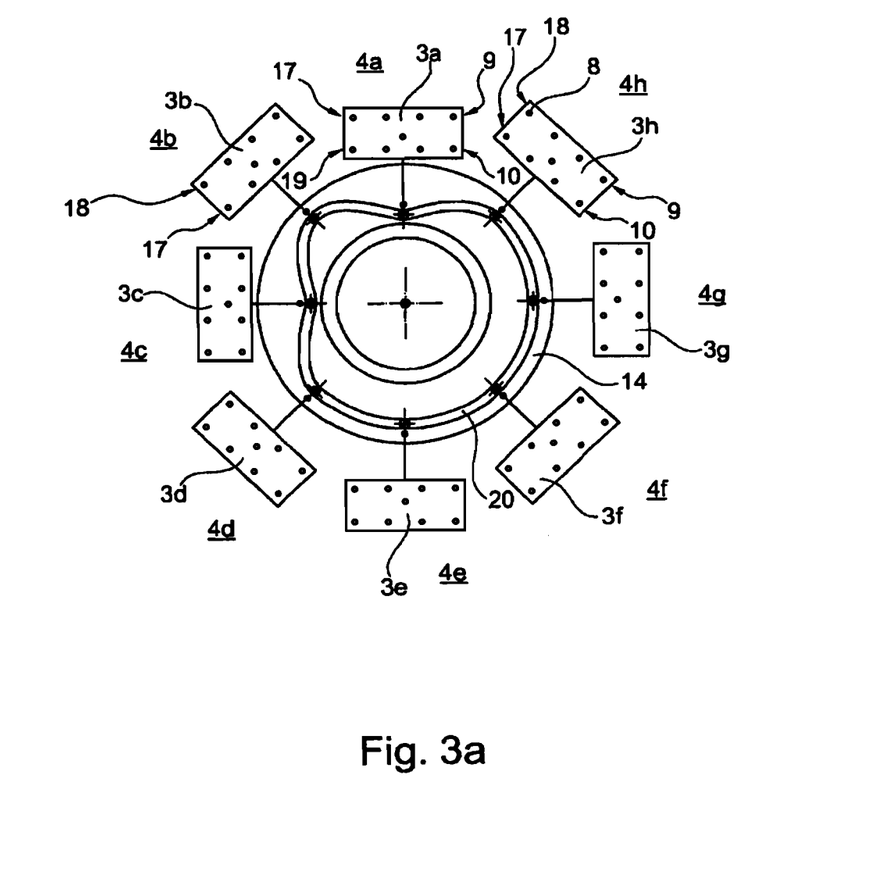
FIGS. 3a to 3f show different relative positions between a cam disk and a plurality of mandrel arrangements, which are arranged next to one another in peripheral direction.
Figure 3B:
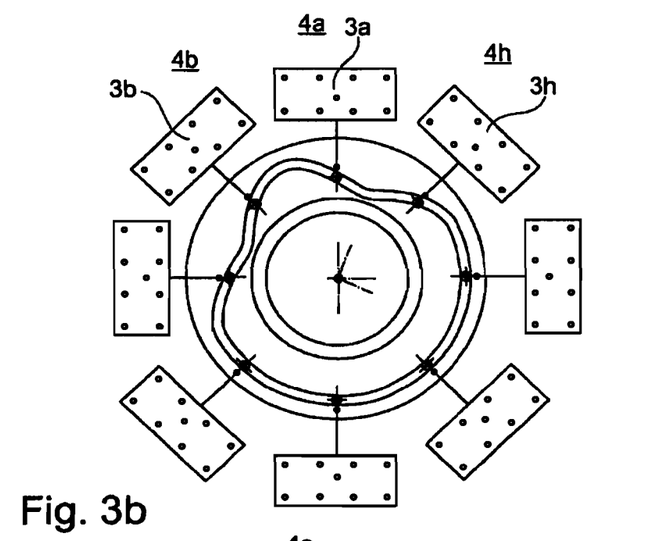
Figure 3C:
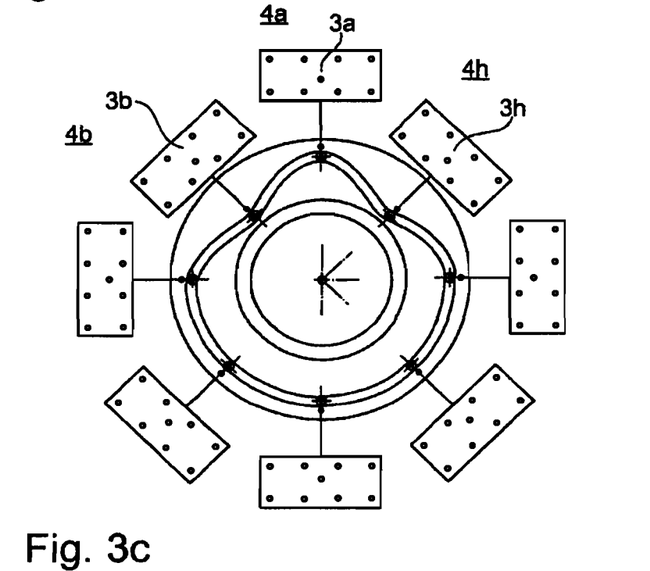

As results from FIG. 3a, the mandrel arrangement 3a with its first mandrel group 9 and with its second mandrel group 10, in each case comprising four mandrels 8 arranged in a row, is located at the work station 4a at a certain clock time and the mandrel arrangement 3b is located at the work station 4b, etc. As results further from FIG. 3a, the second mandrel group 10 is in a processing position 17, in which the work station 4a can interact with the second mandrel group 10, while the first mandrel group 9 is in a radially outer stand-by position 18. The mandrel group 3b, which is adjacent in clockwise direction, is offset radially inwardly relative to the mandrel arrangement 3a, so that the first mandrel group 9 thereof is in a processing position 17 of the work station 4b and the second mandrel group 10 is in a stand-by position 19, which is offset radially inwardly. The mandrel group 3c is in a position, which is offset radially outwardly with reference to the mandrel group 3b, so that, analogously to the mandrel group 3a, the second mandrel group 10 is arranged in a processing position 17 and the first mandrel group 9 in a radially outer stand-by position 8. The mandrel group 3d, in turn, is offset radially inwardly, whereas the mandrel groups 3e-3h are arranged on a radially outer position.

As further results from FIG. 3a, the mandrel arrangements 3a-3h are guided in a guide slot 20 of a cam disk 14, which is located below the transport means, which are not illustrated for reasons of clarity.

A processing of partially all of the mandrels 8 of the mandrel arrangements, but partially of only one of the mandrel groups of the mandrel arrangements now takes place at the work stations 4a-4h. Only the first mandrel group 9 of the mandrel arrangement 3a is equipped at the work station 4a with an insert, for example a partition wall, which is to be welded, for producing a multi-chamber tube. In the case of the work station 4b, the mandrel arrangement 3b only equips the first mandrel group 9 with tube pipe bodies, in the case of the work station 4c, only the second mandrel group 10 of the mandrel arrangement 3c is processed, that is, it is equipped with an extruded plastic ring. All of the mandrels of the mandrel arrangement 3d, that is, both mandrel groups 9, 10 of the mandrel arrangement 3d are processed simultaneously at the work station 4d, that is, a shoulder comprising a spout is molded and is simultaneously integrally molded to the tube pipe body, which is arranged on the mandrels of both mandrel groups. A simultaneous cooling of all of the mandrels 8 or of the tubes of the mandrel arrangements 3e, 3f, 3g, which are arranged in this manner, respectively, takes place in each case at the work stations 4e, 4f and 4g. In the case of the work station 4h, only the second mandrel group 10 is processed, that is, reloaded to the transport device 5, which is shown in FIG. 1.

To be able to process the respective other mandrel group at the work stations 4a, 4b, 4c and 4h, the mandrel arrangements 4a, 4b, 4c, 4h must be adjusted outwardly or inwardly, respectively, in radial direction herein relative to the direction of movement of the mandrel arrangements 3a-3h between the work stations 4a-4h in a translatory manner. As results from a combination of FIGS. 3a to 3d, the cam disk 14 is adjusted clockwise for this purpose, opposite to the direction of movement of the mandrel arrangements 3a-3h from work station to work station when the work equipment is stationary. Due to the guide of the mandrel arrangements 3a-3h in the guide slot 20, the preheated mandrel arrangements 3a, 3b, 3c, 3h are adjusted relative to the direction of movement of the mandrel arrangements 3a-3h from work station to work station in the case of the respective work station 4a, 4b, 4c and 4h, so that the other one of the mandrel group in each case moves into the respective processing position 17, in which the corresponding work station 4a, 4b, 4c, 4h can interact with the corresponding mandrel group. As further results from a combination of FIGS. 3a-3d, the remaining mandrel arrangements 3d, 3e, 3f remain on a fixed relative position to the respective work station 4d, 4e, 4f, 4g. For this purpose, the guide slot 20 has a constant radius in this area.

Figure 3D:
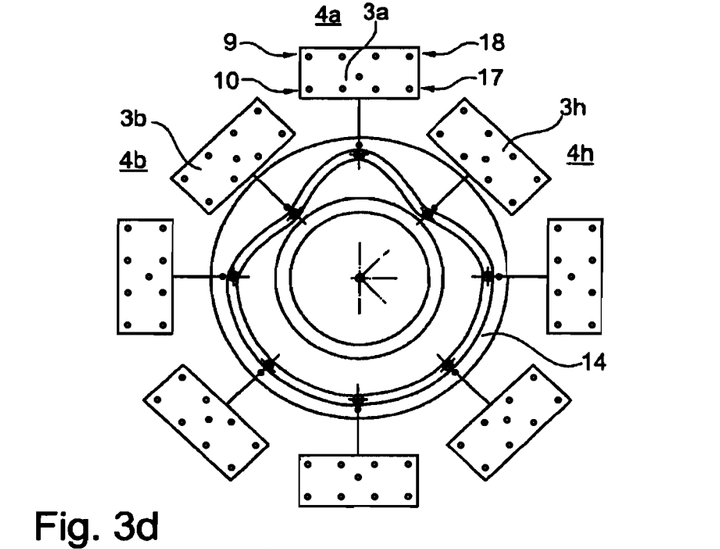

As a whole, the cam disk 14 is adjusted counter-clockwise by 45° between the states, which are shown in FIG. 3a and FIG. 3d. In the state according to FIG. 3d, the respective other mandrel groups of the mandrel arrangements 3a, 3b, 3c, 3h can be processed. Singled out in only an exemplary manner, the second mandrel group 10 of the mandrel group 3a is now in the processing position 17, for example, whereas the first mandrel group 9 of the mandrel arrangement 3a has been adjusted in the radially outer stand-by position 18 in a translatory manner.

Figure 3E:
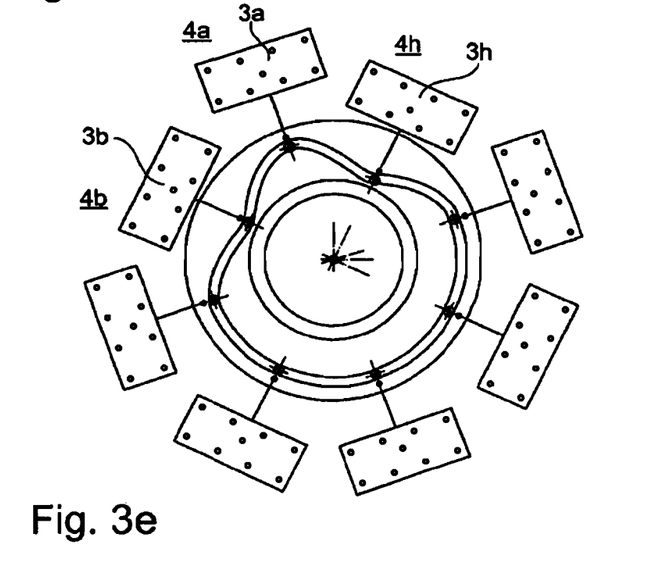
Figure 3F:
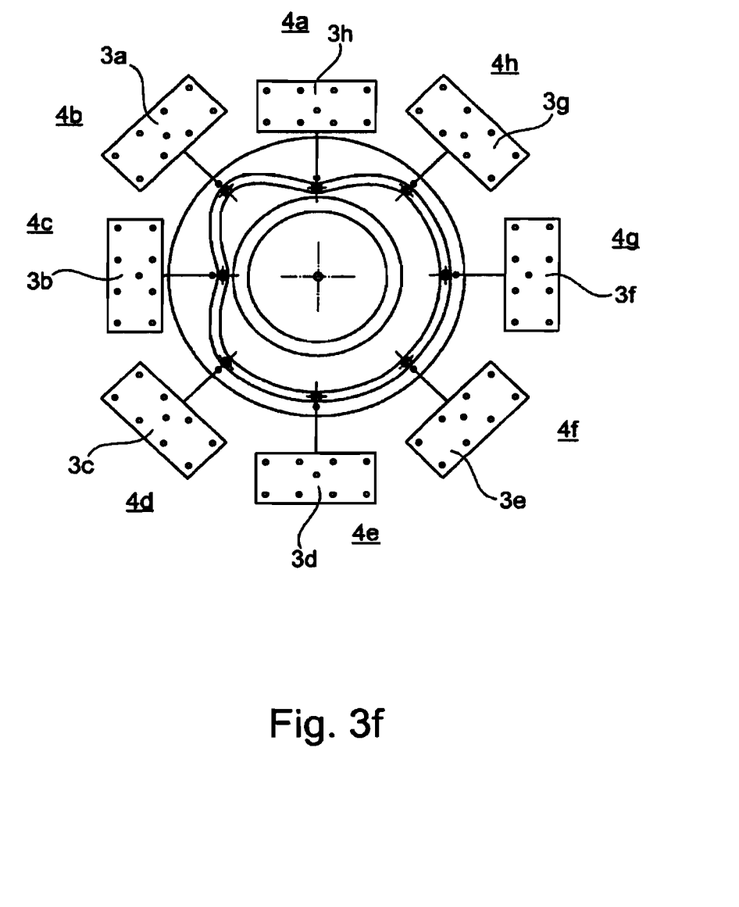

After the mandrel groups 9, 10 or the mandrel arrangements 3a-3h, respectively, have been processed, the mandrel arrangements 3a-3h must now be adjusted in peripheral direction along a circular trajectory to the respective next work station 4b, 4c, 4d, 4f, 4g, 4h, 4a. For this purpose, the transport means 2 are further adjusted counter-clockwise by 45° synchronously to the cam disk 14, so that the cam disk 14 assumes the position represented in FIG. 3f, which incidentally corresponds to the position shown in FIG. 3a. FIG. 3e shows an intermediate movement state of the mandrel arrangements 3a-3h on their way to the next work station 4b, 4c, 4d, 4e, 4f, 4g, 4h, 4a. After individual mandrel groups or the entire mandrel arrangements have been processed, the cam disk is then again adjusted opposite to the direction of movement of the mandrel arrangements 3a-3h, analogously to FIGS. 3b to 3d, so that the mandrel arrangements 3h, 3a, 3b, 3g, which are located at the work stations 4a, 4b, 4c, 4h, are adjusted between a processing position and a stand-by position.

The arrangement or relative adjusting possibility of the mandrel arrangements 3a-3h, respectively, which is explained by means of FIGS. 3a-3f, makes it possible that only four tools, instead of eight tools, must be present at the work stations 4a, 4b, 4c and 4h.

The invention claimed is:

1. A device for producing tubes comprising a plurality of mandrel arrangements, each said mandrel arrangement comprising a plurality of mandrels, on which the tubes can be produced in steps at a plurality of work stations, wherein the mandrel arrangements can be transported from work station to work station with the help of transport means, and wherein the mandrels of at least one of the mandrel arrangements are divided into a first and into at least a second mandrel group and that the first mandrel group can be adjusted from a processing position, which is assigned to the work station, in which the work station can interact with the first mandrel group into a stand-by position, which is assigned to the work station, relative to the transport means in the case of at least one of the work stations, and the second mandrel group can be adjusted from a stand-by position, which is assigned to the work station, into a processing position, which is assigned to the work station, relative to the transport means, wherein the adjusting movement of the first and the second mandrel group is a movement which is guided between the processing position and the stand-by position by means of a cam disk and wherein the cam disk can be rotated in a first direction, in response to a transport of the mandrel arrangements from work station to work station and can be rotated in a second direction, which is opposite to the first direction, for adjusting the first and the second mandrel group between the processing position and the stand-by position or between the stand-by position and the processing position, respectively.

2. The device according to claim 1, wherein the at least one work station, at which the first and the second mandrel groups can be adjusted encompasses a number of tools which corresponds to the number of the mandrels of one of the first and the second mandrel group.

3. The device according to one of claim 1, wherein the first and the second mandrel groups can be adjusted simultaneously between the processing position and the stand-by position or between the stand-by position and the processing position, respectively.

4. The device according to claim 1, wherein the first and second mandrel groups can be adjusted by means of translatory adjustment of the mandrel arrangement, which encompasses the mandrel groups, between the respective processing position and the respective stand-by position.

5. The device according to claim 1, wherein the mandrel groups can be transported from work station to work station on a circular trajectory.

6. The device according to claim 5, wherein the mandrel arrangements are arranged on a table, which can be rotated by means of a servomotor, relative to which the first and the second mandrel group can be adjusted to at least one of the work stations.

7. The device according to claim 1, wherein a stand-by position of one of the first and second mandrel groups at one of the work stations corresponds to the processing position of another work station, which is next in the transport direction.

8. The device according to claim 1, wherein at least one of the work stations is an unloading station and a reloading station for reloading still unfinished tubes onto mandrels, which can be transported to at least one further work station, by means of a transport device.

9. A method for producing tubes using a device, wherein provision is made for a plurality of mandrel arrangements, each said mandrel arrangement comprising a plurality of mandrels, on which the tubes can be produced in steps at a plurality of work stations, wherein the mandrel arrangements can be transported from work station to work station, said method comprising dividing the mandrels of the mandrel arrangements into a first mandrel group and a second mandrel group, adjusting the first mandrel group from a processing position, which is assigned to the work station, in which the work station can interact with the first mandrel group into a stand-by position, which is assigned to the work station, relative to the transport means in the case of at least one of the work stations, and adjusting the second mandrel group from a stand-by position, which is assigned to the work station, into a processing position, which is assigned to the work station, relative to the transport means, wherein said adjusting steps comprise realizing the adjusting movement of the first and the second mandrel groups between the processing position and the stand-by position by means of a cam disk, and further comprising rotating the cam disk in a transport direction of the mandrel arrangements in response to a transport of the mandrel arrangements from work station to work station and rotating the cam disk in a second direction, which is opposite to the first direction, for adjusting the first and the second mandrel groups between the processing position and the stand-by position or between the stand-by position and the processing position, respectively.

10. The method according to claim 9, wherein said adjusting steps comprise adjusting the first and second mandrel groups by means of translatory adjustment of the mandrel arrangement, which encompasses the mandrel groups, between the respective processing position and the respective stand-by position.

11. The method according to claim 9, further comprising transporting the mandrel groups from work station to work station on a circular trajectory.

* * * * *